No. 611,855. Patented Oct. 4, 1898.
F. O. BALL.
LUBRICATING DEVICE FOR ECCENTRICS.
(Application filed Jan. 8, 1898.)
(No Model.)
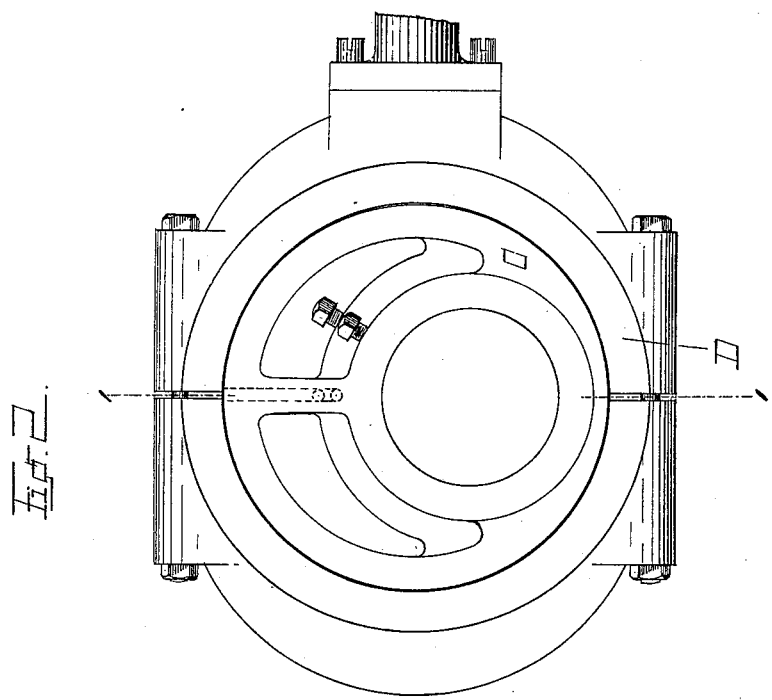
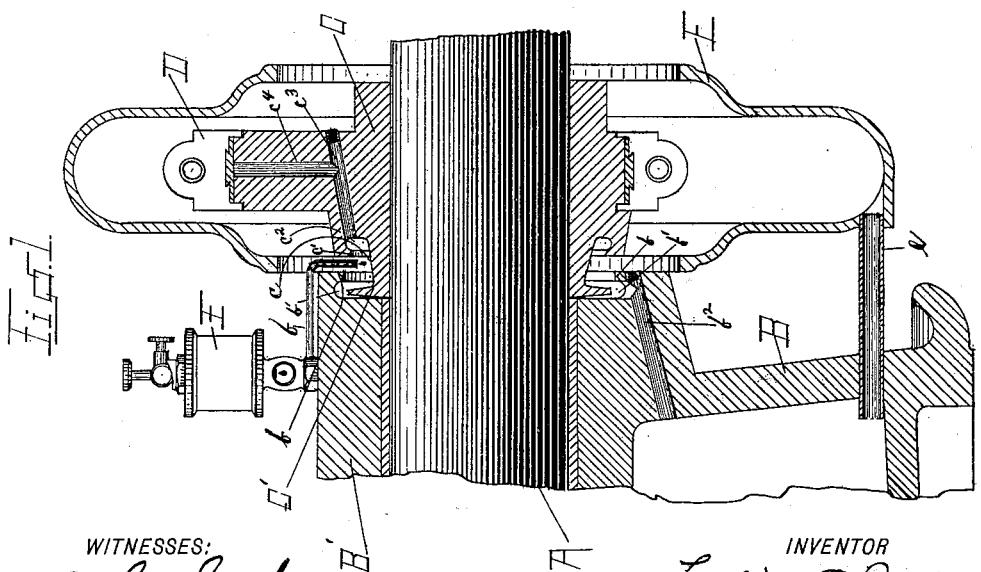
WITNESSES:
John Lord.
M. A. Lord.
INVENTOR
Frederick O. Ball
BY H. C. Lord.
ATTORNEY.
THE NORRIS PETERS CO., PHOTO-LITHO., WASHINGTON, D. C.

UNITED STATES PATENT OFFICE.

FREDERICK OSSIAN BALL, OF PLAINFIELD, NEW JERSEY.

LUBRICATING DEVICE FOR ECCENTRICS.

SPECIFICATION forming part of Letters Patent No. 611,855, dated October 4, 1898.

Application filed January 8, 1898. Serial No. 666,028. (No model.)

*To all whom it may concern:*

Be it known that I, FREDERICK OSSIAN BALL, a citizen of the United States, residing at Plainfield, in the county of Somerset and State of New Jersey, have invented certain new and useful Improvements in Lubricating Devices for Eccentrics; and I do hereby declare the following to be a full, clear, and exact description of the invention, such as will enable others skilled in the art to which it appertains to make and use the same.

This invention relates to lubricating devices for eccentrics; and it consists in certain improvements in the construction thereof, as will be hereinafter fully described, and pointed out in the claims.

The invention is illustrated in the accompanying drawings, as follows:

Figure 1 shows a section of the device, the line of section being indicated by the line 1 1 in Fig. 2. Fig. 2 shows a side elevation of the eccentric.

A marks the shaft on which the eccentric is mounted, usually the crank-shaft of the engine; C, the eccentric mounted on the shaft, and D the eccentric-strap. These parts may, except as hereinafter noted, be of any desired construction.

The hub of the eccentric has at one side the conical or inclined surface $c$, flaring toward the eccentric. The surface $c$ leads to the annular cavity $c^2$, which is formed by the flange $c'$ on the eccentric. Leading from the cavity $c^2$ are ducts $c^3$ $c^4$, which extend to the bearing of the eccentric.

The purpose of the conical surface $c$ is to convey oil from a convenient point beside the eccentric into some collecting means, as the cavity $c^2$, so that the oil can be readily directed into the ducts leading to the bearing. In operation the oil is dropped onto the conical surface $c$. The natural adhesive qualities of the oil retain it on the surface, and the centrifugal force due to the revolution of the parts in use carries the oil in the direction of the larger circumference into the cavity $c^2$. It is preferable to make the cavity $c^2$ slightly eccentric to the shaft, the point at the greatest distance from the center of the shaft being at the duct $c^3$. This arrangement of the cavity gives to oil entering it an immediate direction of flow toward the duct $c^3$. A concentric arrangement of the cavity $c^2$ would operate, but would be less desirable, as the flow of oil would then depend largely upon an accumulation in the cavity, and therefore would not be so direct or positive.

A case E surrounds the eccentric and catches the oil thrown from the bearing. A pipe $e$ conducts the oil thus caught to the engine-bed, from which it may be drawn as desired.

An oil-cup and drop mechanism F is provided, and from this a tube $b$ leads to a position over the conical surface $c^2$, so that the oil is dropped from the tube to the surface as desired.

It is desirable to prevent the oil from the shaft-bearing going through the eccentric-bearing also. For this purpose a flange $C'$ is placed on the hub of the eccentric between the conical surface $c^2$ and the shaft-bearing. A cavity $b'$, formed by the flange $b$, is arranged in the box $B'$, so as to catch the oil from the flange $C'$, and this, as will readily be seen, prevents the passage of oil from the shaft-bearing to the eccentric. A duct $b^2$ leads from the cavity $b'$ into the engine-bed, where the oil may be collected, if desired.

What I claim as new is—

1. In a lubricating device for eccentrics, the combination of the eccentric-strap; and an eccentric having a conically-surfaced hub flaring toward the eccentric; and means for conveying the oil from the hub surface to the eccentric-bearing.

2. In a lubricating device for eccentrics, the combination of the eccentric-strap; and an eccentric having its hub provided with the conical surface $c$ flaring toward the eccentric, and having an oil-collecting cavity at the eccentric side of said surface, and ducts leading therefrom to the eccentric-bearing.

3. In a lubricating device for eccentrics, the combination of the eccentric-strap; and an eccentric having its hub provided with the conical surface, $c$, flaring toward the eccentric, and having an oil-collecting cavity, $c^2$, eccentric to the axis of revolution, said cavity being connected at the point the most remote from the axis of revolution with the eccentric-bearing.

4. In a lubricating device for eccentrics, the combination of the eccentric-strap; an eccentric having a conically-surfaced hub flaring toward the eccentric; means for conveying the oil from the hub surface to the eccentric-bearing; and a feed mechanism arranged to supply oil to the conical surface of the said hub.

5. In a lubricating device for eccentrics, the combination of the eccentric-shaft; a bearing therefor; an eccentric on said shaft having a conically-surfaced hub flaring toward the eccentric; a flange C', separating said hub from the shaft-bearing; means for conveying the oil from the hub surface to the eccentric-bearing and the eccentric-strap.

In testimony whereof I affix my signature in presence of two witnesses.

FREDERICK OSSIAN BALL.

Witnesses:
A. M. BALL,
S. B. DAUGHERTY.